United States Patent Office 3,756,993
Patented Sept. 4, 1973

3,756,993
POLYMERIZATION CONTROL IN WHICH A UNIFORM RATE OF REACTION IS MAINTAINED
Kenneth J. Green, deceased, late of Bartlesville, Okla., by Ralph Green, administrator, Bozeman, Mont., assignor to Phillips Petroleum Company
Filed Mar. 17, 1970, Ser. No. 20,372
Int. Cl. C08g 23/00
U.S. Cl. 260—79.1                    10 Claims

ABSTRACT OF THE DISCLOSURE

In the production of arylene sulfide polymers, the temperature of the reaction zone is increased from a first temperature to a second temperature at a rate such that the reaction rate is uniform with respect to time. Thereafter, the zone is maintained at the second temperature.

---

It is known that arylene sulfide polymers having good high temperature properties can be prepared by reacting at least one polyhalo-substituted cyclic compound containing unsaturation between adjacent ring atoms and wherein the halogen atoms are attached to ring carbon atoms, with an alkali metal sulfide in a polar organic compound at an elevated temperature. In general, the polar organic compound substantially dissolves both the alkali metal sulfide and the polyhalo-substituted organic compound. The polymerization is usually carried out in a batch reactor because of the relatively long time required to obtain a high conversion of reactants.

In order to design an efficient system for carrying out reactions of this type, it is necessary to be able to control the rate of reaction so as to minimize the amount of heat that is generated in a given time interval. Otherwise, the highly exothermic nature of the reaction would require heat exchange equipment of excessively large size.

In accordance with this invention, a method is provided for controlling polymerization reactions of the type described. This control is based on maintaining a uniform rate of reaction until a predetermined temperature is reached. Thereafter, a reactor is maintained at substantially this temperature. This procedure minimizes the heat exchange requirements in the reactor and prevents degradation of the polymer by limiting the maximum temperature within the reactor.

Figure 1:
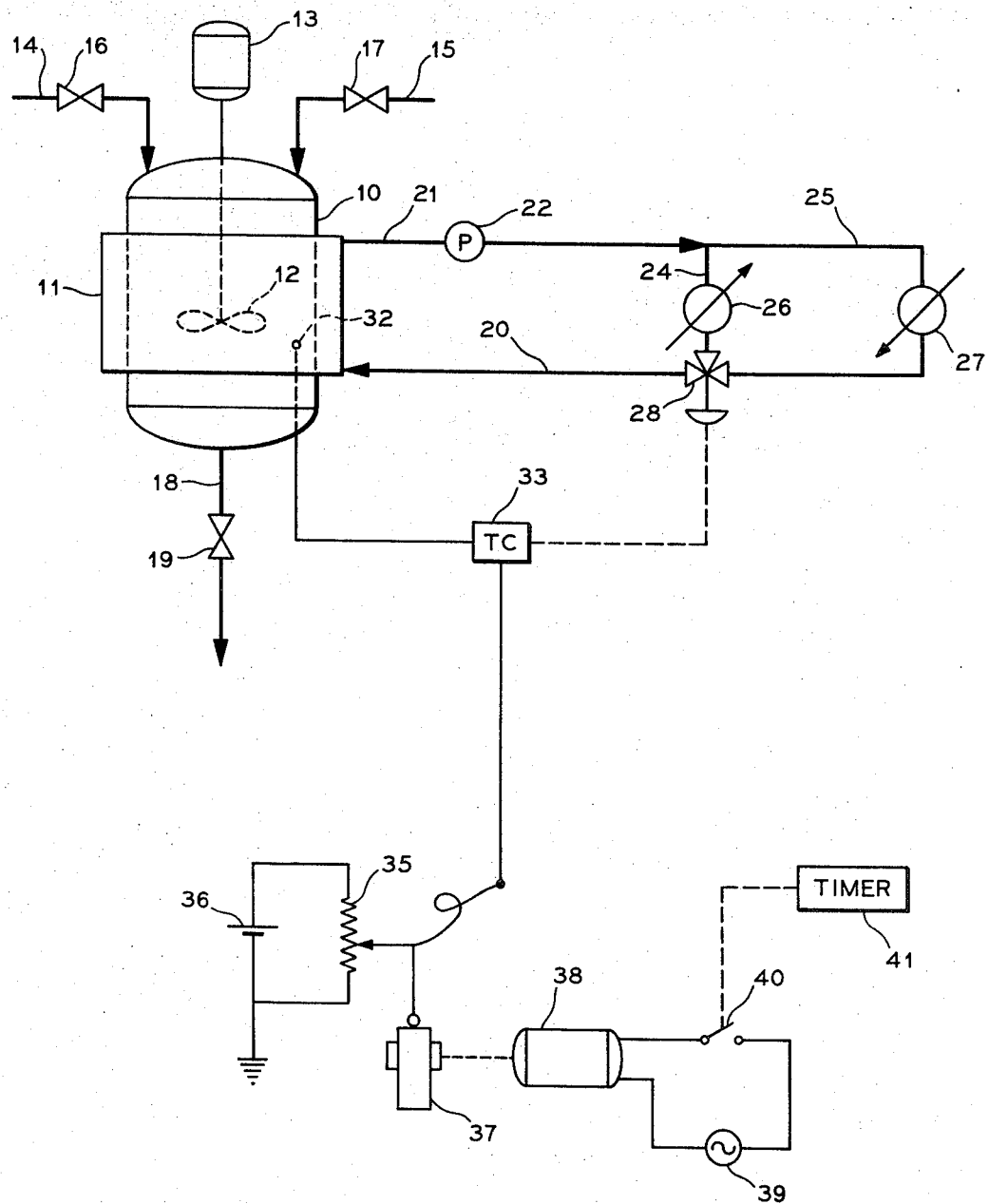
Figure 2:
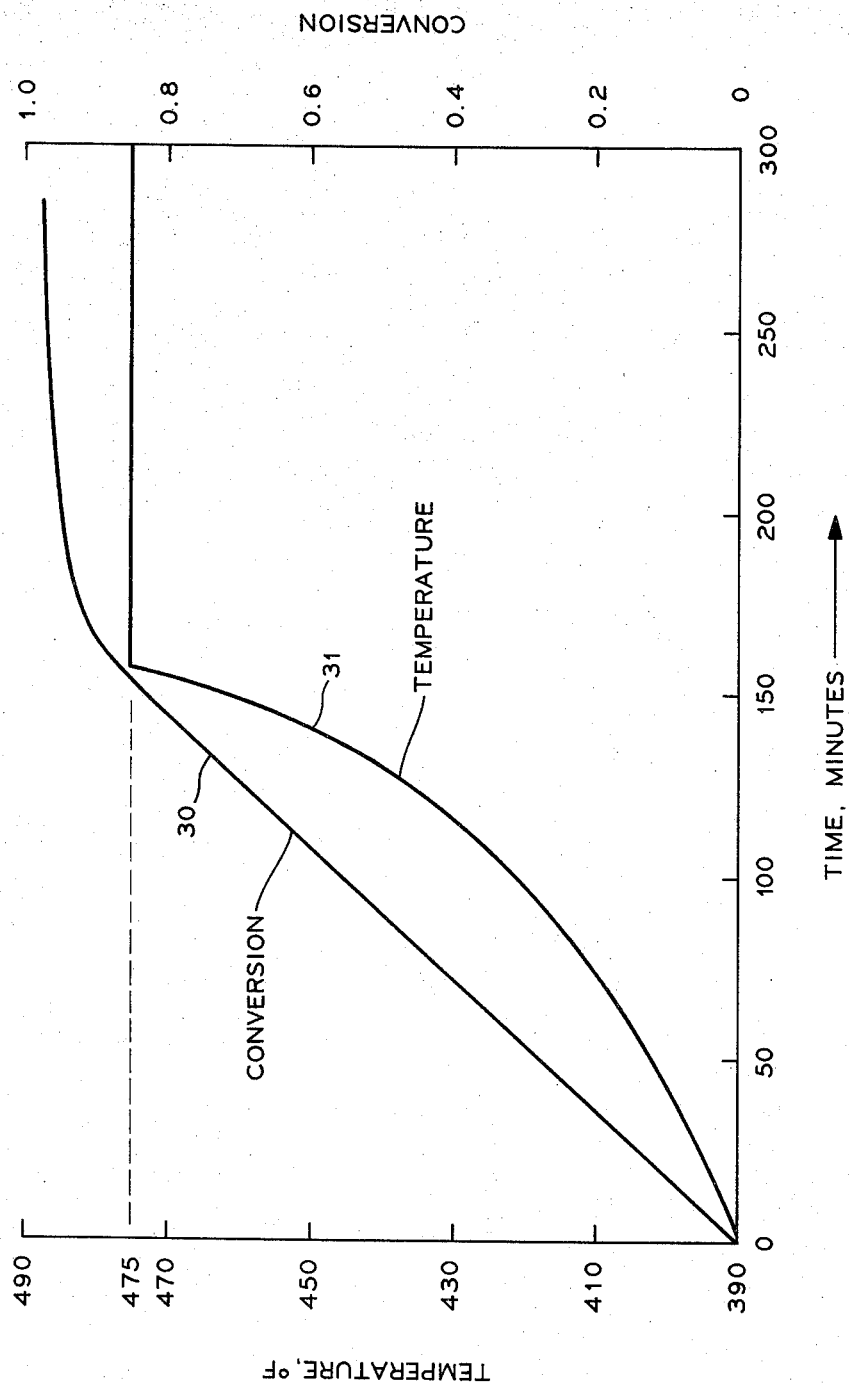

In the accompanying drawing, FIG. 1 is a schematic representation of apparatus which can be employed to carry out the control method of this invention. FIG. 2 is a graphical representation of operating features of the control method of this invention.

Referring now to the drawing in detail and to FIG. 1 in particular, there is shown a reactor 10 which is provided with a jacket 11 through which a heat exchange medium can be circulated. Reactor 10 is provided with a stirrer 12 which is rotated by a motor 13. Conduits 14 and 15, which have respective valves 16 and 17 therein, communicate with reactor 10 to introduce reactants. Product is removed through a conduit 18 which has a valve 19 therein.

In order to control the temperature of reactor 10, a heat exchange medium is circulated through jacket 11. This medium is introduced into the jacket through a conduit 20 and is withdrawn through a conduit 21. Conduit 21 has a pump 22 therein to force the heat exchange medium in a circular path which includes jacket 11. Branch conduits 24 and 25 extend between conduit 21 and conduit 20. A heater 26 is disposed in conduit 24 and a cooler 27 is disposed in conduit 25. A control valve 28 serves to connect conduits 24 and 25 with conduit 20 so that the relative flows through conduits 24 and 25 can be adjusted. This serves to control the temperature of the heat exchange medium introduced into jacket 11. Valve 28 is controlled in accordance with this invention to permit adjustment of the rate of reaction and the temperature within the reactants.

The polyhalo-substituted cyclic compound is introduced through conduit 14. Suitable compounds which can be so employed are represented by the formulas

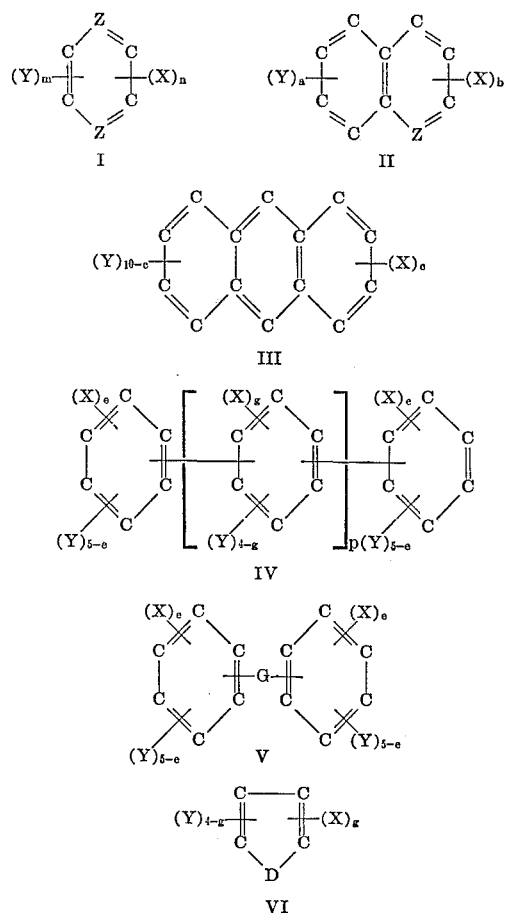

wherein each X is a halogen selected from the group consisting of chlorine, bromine, iodine, and fluorine, preferably chlorine and bromine, each Y is selected from the group consisting of hydrogen,

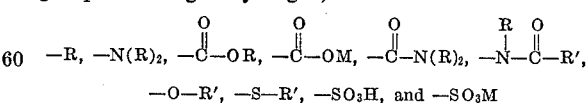

wherein each —R is selected from the group consisting of hydrogen and alkyl, cycloalkyl, aryl, aralkyl, and alkaryl radicals containing from 1 to 12 carbon atoms, inclusive; each R' is selected from the group consisting of alkyl, cycloalkyl, aryl, aralkyl and alkaryl radicals containing from 1 to 12 carbon atoms, inclusive; each Z is selected from the group consisting of —N= and —C=; D is selected from the group consisting of

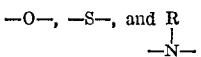

G is selected from the group consisting of

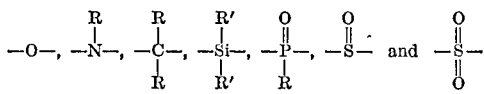

M is an alkali metal selected from the group consisting of sodium, potassium, lithium, rubidium, and cesium; $n$ is a whole integer of from 2 to 6 inclusive; when both Z's in Formula I are —C=, $m=6-n$, when one Z in Formula I is —C=, $m=5-n$, when both Z's in Formula I are —N=, $m=4-n$; $b$ is a whole integer of from 2 to 8 inclusive, when Z in Formula II is —C=, $a=8-b$, when Z in Formula II is —N=, $a=7-b$, c is a whole integer of from 2 to 10, inclusive, $e$ is a whole integer of from 1 to 5, inclusive, $g$ is a whole integer of from 2 to 4, inclusive, and $p$ is a whole integer selected from the group consisting of 0 and 1.

The compounds of the above general formulas which are preferred are those which contain not more than three halogen atoms, and more preferably are dihalo-substituted compounds. Numerous examples of these compounds are set forth in U.S. Pat. 3,354,129 of Edmonds and Hill, which patent is hereby incorporated by reference.

A mixture of the alkali metal sulfide and polar organic compound is introduced through conduit 15. The alkali metal sulfides which can be employed are represented by the formula $M_2S$ where M is as defined above. These sulfides include the mono-sulfides of sodium, potassium, lithium, rubidium and cesium, including both the anhydrous and hydrated forms. The preferred sulfide is $Na_2S$, either as such or hydrated.

The polar organic compounds which are employed are solvents for the polyhaloaromatic compounds and the alkali metal sulfides. Representative examples of suitable classes of compounds include amides, lactams, sulfones, and the like. Specific examples of such compounds are hexamethylphosphoramide, tetramethylurea, N,N'-ethylene dipyrollidone, N-methyl-2-pyrrolidone (NMP), pyrrolidone, caprolactam, N-ethylcaprolactam, sulfolane, dimethylacetamide, low molecular weight polyamides and the like.

In order to carry out the polymerization reaction, it is necessary to elevate the temperature of the reactants to a predetermined level. Since the reaction is exothermic, it then becomes necessary to cool the reactor in order to prevent excessive temperatures from being reached. When dichlorobenzene and sodium sulfide mono-hydrate is reacted in a mol ratio of approximately 1:1, for example, the reaction is initiated at a temperature of approximately 390° F. In this reaction, it is generally desirable to prevent the temperature from exceeding approximately 475° F. In accordance with this invention, the temperature of the reactor is controlled so that the reaction takes place at substantially a uniform rate until the maximum desired temperature is reached. Thereafter, the temperature of the reactor is maintained at substantially this maximum value. Reaction rate tapers off until reaction is completed. Curve 30 in FIG. 2 of the drawing represents the conversion in a typical reaction system of the type described when the temperature is maintained in accordance with curve 31. It can be seen that the conversion increases uniformly until a temperature of approximately 475° F. is reached. This constant reaction rate is maintained by controlling the temperature of the reactor in accordance with the profile of curve 31. This control is accomplished by the remainder of the apparatus illustrated in FIG. 1. The curves of FIG. 2 are representative of reaction employing sodium sulfide and 1,4-dichlorobenzene in respective ratios of 0.324 pound mole and 0.334 pound mole per 128.3 pounds of N-methyl-2-pyrrolidone.

A temperature sensing element 32 is disposed within reactor 10 to provide an output signal which is representative of the temperature of the reaction mixture. This signal, which can be electrical in nature, is applied to the input of a conventional temperature controller 33. Controller 33 compares this measured temperature with a set point signal and establishes an output signal which regulates valve 28. If the measured temperature should be less than the set point value, valve 28 is adjusted in a direction to increase the temperature of the heat exchange medium introduced through conduit 20. Conversely, a measured temperature in excess of the set point value results in valve 28 being moved in the opposite direction. The set point signal applied to controller 33 is obtained from a potentiometer 35. A voltage source 36 is connected across the end terminals of potentiometer 35, and the contactor of the potentiometer is connected to the set point input of controller 33. The position of the contactor of the potentiometer 35 is adjusted by a cam 37 which is rotated by a motor 38 through a suitable gear train, not shown. Motor 38 is connected to a current source 39 when a switch 40 is closed by a timer 41.

At the start of a reaction cycle, valves 16 and 17 are opened to introduce the desired quantities of reactants and solvent into reactor 10. It is preferable to introduce these materials at a temperature of the order of 390° F. in order that the reaction may start shortly after the reactants are introduced. If not, it is necessary to heat the reactor by circulating the heat exchange medium through heater 26. After the reactants are introduced and the temperature is about 390° F., timer 31 is actuated to close switch 40 and energize motor 38. Cam 37 is designed so that the voltage applied to the set point of controller 33, which voltage is calibrated to be representative of temperature, increases as a function of time in accordance with the desired increase in temperature within the reactor, as illustrated by curve 31 in FIG. 2. Motor 38 can be provided with a suitable gear box to control the rotation of cam 37 at the proper speed. As previously mentioned, controller 33 compares the set point signal to the measured temperature within the reactor and adjusts the temperatures of the heat exchange medium so that the reactor temperature is permitted to increase in accordance with curve 31. Timer 41 open switch 40 at the end of a predetermined time interval which corresponds to the time necessary to increase the reactor temperature to 475° F. Thereafter, the contactor of potentiometer 35 remains fixed at a point corresponding to this temperature so that the temperature of the reactor does not increase further. At the end of a predetermined reaction period, valve 19 is opened to drain the reactor and pass the effluent to suitable separation means, not shown. In this separation means, the polymer is separated from the solvent and any unreacted materials.

The exact shape of curve 31 which is required to maintain a constant reaction rate in any given reaction system can be determined experimentally by adjusting the reactor temperature manually and periodically sampling the reactor to determine the degree of conversion. From such data, the desired shape of curve 31 can be established. Cam 37 is then designed to provide a temperature increase along the shape of the established curve. It is generally desirable to increase the temperature of the reactor at as rapid a rate as possible, considering the physical limitations of the heat exchange equipment. By maintaining a constant reaction rate in the reactor until the desired maximum temperature is reached, the resulting polymer has characteristics which remain uniform from batch to batch. For any given reaction system there exists a temperature which should not be exceeded if desired polymer properties are to be realized. This temperature can readily be determined by routine tests for any given set of reactants. For sodium sulfide and 1,4-dichlorobenzene, this temperature is about 475° F.

While this invention has been described in conjunction with presently preferred embodiments, it obviously is not limited thereto.

What is claimed is:

1. In a process for producing arylene sulfide polymer by reacting (1) a first reactant selected from the group consisting of

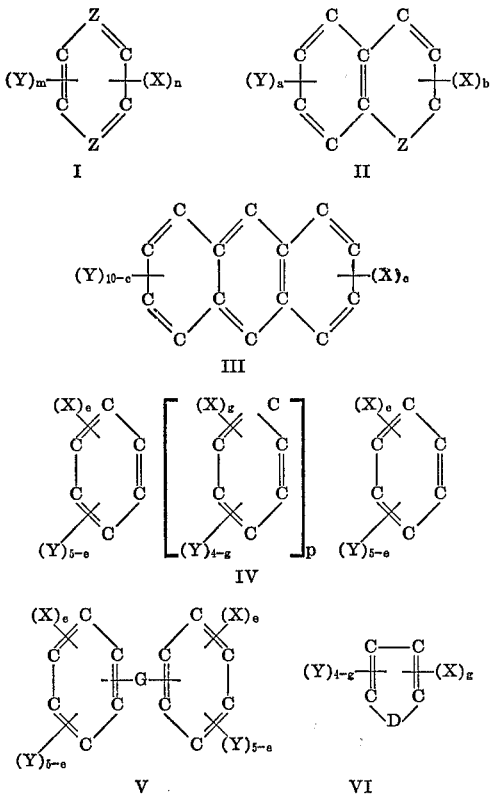

wherein each X is a halogen selected from the group consisting of chlorine, bromine, iodine, and fluorine, each Y is selected from the group consisting of hydrogen,

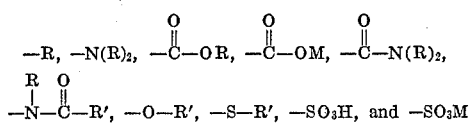

wherein each —R is selected from the group consisting of hydrogen and alkyl, cycloalkyl, aryl, aralkyl, and alkaryl radicals containing from 1 to 12 carbon atoms, inclusive, each R' is selected from the group consisting of alkyl, cycloalkyl, aryl, aralkyl and alkaryl radicals containing from 1 to 12 carbon atoms, inclusive, each Z is selected from the group consisting of —N= and —C=, D is selected from the group consisting of

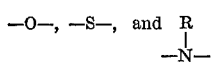

G is selected from the group consisting of

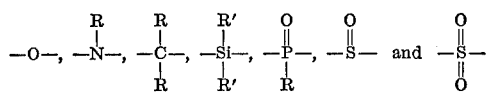

M is an alkali metal selected from the group consisting of sodium, potasisum, lithium, rubidium, and cesium; $n$ is a whole integer of from 2 to 6, inclusive, when both Z's in Formula I are —C=, $m=6-n$, when one Z in Formula I is —C=, $m=5-n$, when both Z's in Formula I are —N=, $m=4-n$; $b$ is a whole integer of from 2 to 8, inclusive, when Z in Formula II is —C=, $a=8-b$, when Z in Formula II is —N=, $a=7-b$, $c$ is a whole integer of from 2 to 10, inclusive, $e$ is a whole integer of from 1 to 5, inclusive, $g$ is a whole integer of from 2 to 4, inclusive, and $p$ is a whole integer selected from the group consisting of 0 and 1, with (2) a second reactant selected from the group consisting of alkali metal sulfides of the formula $M_2S$, where M is as defined above, in the presence of a solvent which is a polar organic solvent that substantially dissolves both of the reactants; the method which comprises charging the first and second reactants and solvent to a reaction zone, withdrawing heat from the reaction zone at a controlled rate so that the temperature within the reaction zone increases from a first temperature at which the reaction is initiated to a second higher temperature at a rate such that the reaction rate of the reactants to form polymer remains constant with respect to time, and thereafter withdrawing heat from the reaction zone at a controlled rate such that the temperature within the reaction zone is maintained substantially constant at said second temperature to complete the reaction of said reactants.

2. The method of claim 1 wherein said reactants and solvent are introduced into the reaction zone at substantially said first temperature.

3. The method of claim 1 wherein said reactants and solvent are introduced into the reaction zone at a temperature less than said first temperature and are heated within said reaction zone to said first temperature to initiate the reaction.

4. The method of claim 1 wherein coolant is passed in heat exchange relationship with the reaction zone to withdraw heat therefrom, and wherein the temperature of the coolant is adjusted to maintain said controlled rates.

5. In a process for producing an arylene sulfide polymer by reacting a first reactant dichlorobenzene with a second reactant sodium sulfide in the presence of a polar organic solvent that substantially dissolves both of the reactants; the method which comprises charging the reactants and solvent to a reaction zone, withdrawing heat from the reaction zone at a controlled rate so that the temperature within the reaction zone increases from a first temperature at which the reaction is initiated to a second higher temperature at a rate such that the reaction rate of the reactants to form polymer remains constant with respect to time, and thereafter withdrawing heat from the reaction zone at a controlled rate such that the temperature within the reaction zone is maintained substantially constant at said second temperature to complete the reaction of said reactants.

6. The method of claim 5 wherein said first temperature is about 390° F. and said second temperature is about 475° F.

7. The method of claim 6 wherein coolant is passed in heat exchange relationship with the reaction zone to withdraw heat therefrom, and wherein the temperature of the coolant is adjusted to maintain said controlled rates.

8. The method of claim 5 wherein said reactants and solvent are introduced into the reaction zone at substantially said first temperature.

9. The method of claim 5 wherein said reactants and solvent are introduced into the reaction zone at a temperature less than said first temperature and are heated within said reaction zone to said first temperature to initiate the reaction.

10. The method of claim 5 wherein the temperature is increased with respect to time in accordance with the configuration of curve 31 of FIG. 2 of the drawing.

References Cited

UNITED STATES PATENTS

| | | | |
|---|---|---|---|
| 3,354,129 | 11/1967 | Edmonds, Jr. et al. | 260—79 |
| 3,457,242 | 7/1969 | Hill, Jr. | 260—79 |
| 3,524,835 | 8/1970 | Edmonds, Jr. et al. | 260—79.1 |
| 3,254,071 | 5/1966 | Morgan et al. | 260—94.9 |
| 3,297,412 | 1/1967 | Phillips et al. | 23—285 |

MAURICE J. WELSH, Primary Examiner

M. I. MARQUIS, Assistant Examiner

U.S. Cl. X.R.

23—230 A; 260—79

UNITED STATES PATENT OFFICE
CERTIFICATE OF CORRECTION

Patent No. 3,756,993　　　　　　　　　　　　　　Dated: September 4, 1973

Kenneth J. Green (deceased)

It is certified that error appears in the above-identified patent and that said Letters Patent are hereby corrected as shown below:

Column 5, lines 15-22, delete Formula II as shown and insert the following correct formula

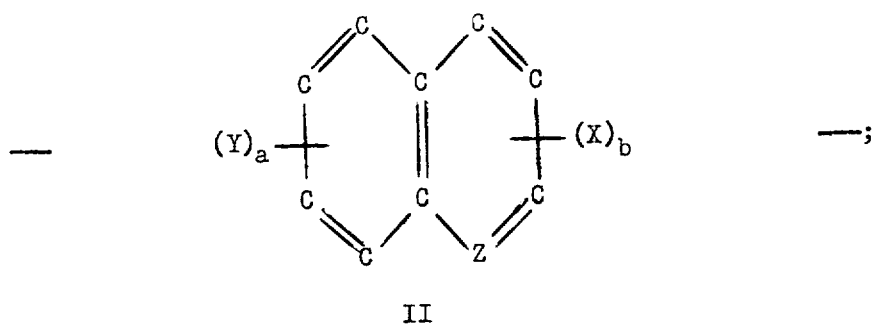

column 5, lines 31-38, delete Formula IV as shown and insert the following correct formula

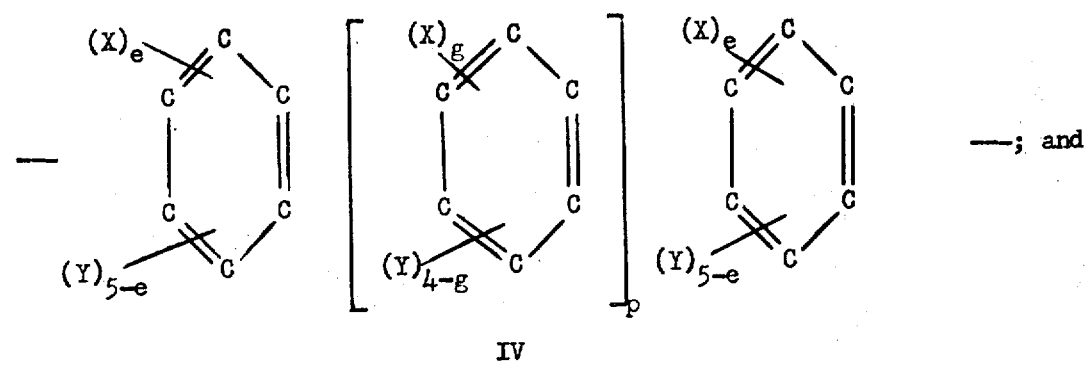

column 6, line 2, delete "potasisum" and insert — potassium —.

Signed and sealed this 25th day of December 1973.

(SEAL)
Attest:

EDWARD M. FLETCHER, JR.　　　　　RENE D. TEGTMEYER
Attesting Officer　　　　　　　　　Acting Commissioner of Patents